United States Patent [19]

Pilkington

[11] Patent Number: 4,818,620
[45] Date of Patent: Apr. 4, 1989

[54] ELASTOMER COATED LIP SEAL

[75] Inventor: Andy C. Pilkington, Tecumseh, Mich.

[73] Assignee: Mather Seal Company, Milan, Mich.

[21] Appl. No.: 211,173

[22] Filed: Jun. 22, 1988

Related U.S. Application Data

[63] Continuation of Ser. No. 917,569, Oct. 10, 1986, abandoned.

[51] Int. Cl.⁴ .................. B32B 15/04; B32B 15/06; B32B 27/08; B32B 27/40
[52] U.S. Cl. .................... 428/422; 277/152; 277/166; 428/423.1; 428/425.8; 428/457; 428/465; 428/492
[58] Field of Search ............. 428/422, 318.6, 457, 428/465, 492, 425.8, 423.1; 277/152, 166

[56] References Cited

U.S. PATENT DOCUMENTS

| | | | |
|---|---|---|---|
| 4,147,824 | 4/1979 | Dettmann et al. | 428/318.6 |
| 4,243,235 | 1/1981 | Repella | 277/152 |
| 4,526,383 | 7/1985 | Fuchs et al. | 277/152 |

*Primary Examiner*—Thomas J. Herbert
*Attorney, Agent, or Firm*—Lawrence J. Shurupoff; Robert F. Hess

[57] ABSTRACT

A lip seal having enhanced shock loading capabilities includes a rigid case member coated with an elastomeric material. A composite annular sealing lip having a bonding portion formed of an elastomeric material and a contact portion formed of polytetrafluoroethylene is bonded to the case member such that a shock absorbing elastomer to adhesive to elastomer interface is formed between the sealing lip and the case coating.

6 Claims, 1 Drawing Sheet

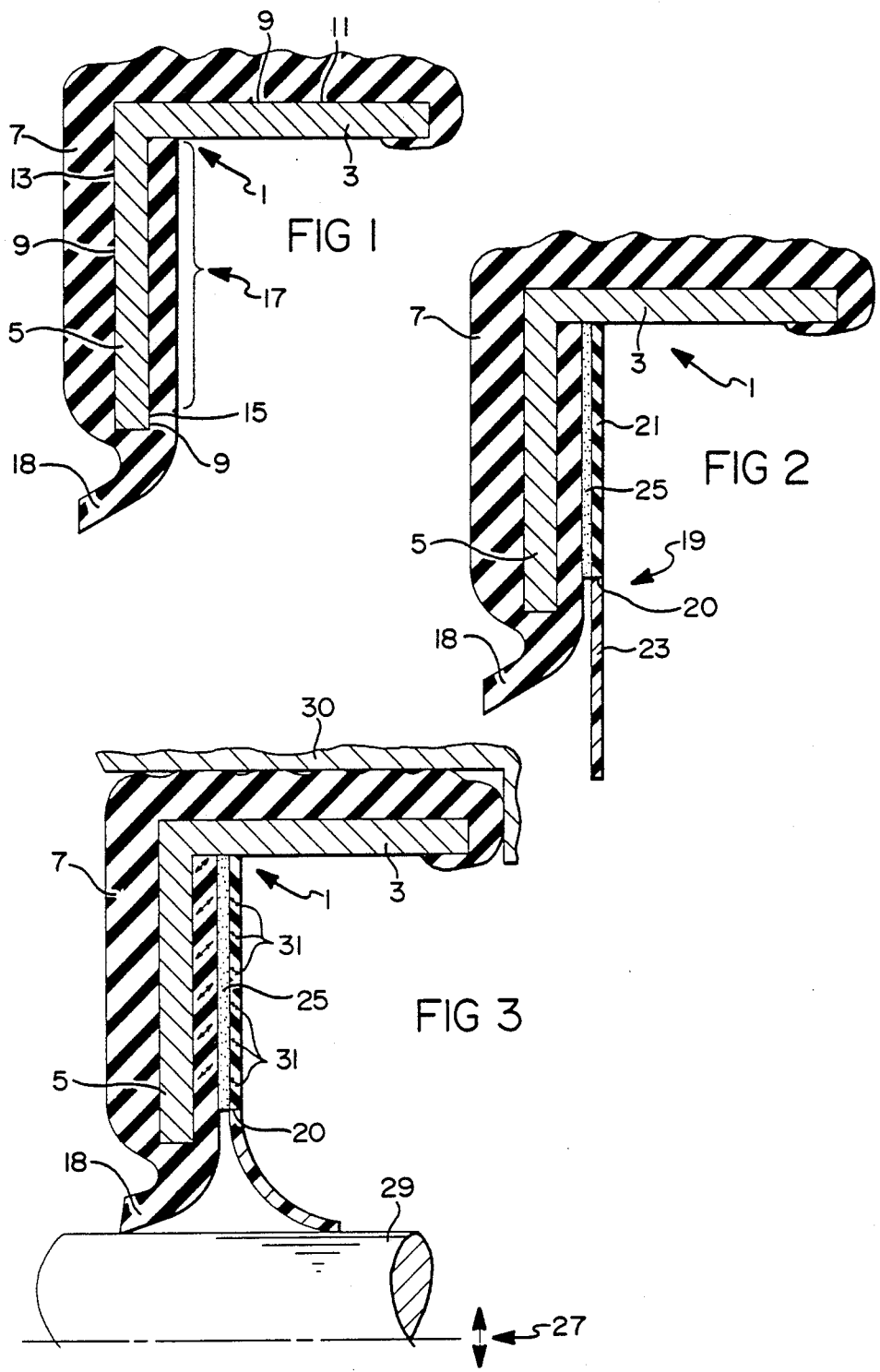

ELASTOMER COATED LIP SEAL

This application is a continuation of application Ser. No. 917,569 filed Oct. 10, 1986, now abandoned.

BACKGROUND OF THE INVENTION

1. Field of the Invention

This invention relates generally to a lip seal and more particularly relates to a composite lip seal coated with an elastomeric material for sealing bore irregularities and split housings.

2. Description of Prior Developments

This invention is primarily intended to improve the lip seal structure disclosed in U.S. Pat. No. 4,243,235 to Repella the specification of which is incorporated herein by reference. Repella discloses a composite polytetrafluoroethylene and elastomeric lip seal bonded directly to a rigid case formed of a metal or plastic material. While this seal structure is generally satisfactory for its intended purpose, several drawbacks hav been associated with the bond interface between the rubber portion of the composite lip seal and the rigid seal case. More particularly, by bonding the rubber portion of the composite lip directly to a rigid surface, an inherent drawback arises wherein the unyielding nature of the rubber-to-metal bond does not well accommodate shock loading of the type commonly experienced in lip seal applications. This can result in premature failure of the bond and shortened seal life.

In order to allow for the surface irregularities frequently present within seal mounting bores, recent seal designs have included elastomeric or rubber coatings over the entire outer surface portions along the outer diameter of the seal case member. Such designs typically necessitate the treatment of the rigid metal or plastic case member with a rust preventative coating, when needed, followed by a subsequent coating of a thermosetting adhesive for effecting a strong bond between the rigid case member and the elastomeric material which covers or coats the case. During the vulcanization of the elastomeric material on the outer portion of the case, the adhesive which entirely coats the case, thermally reacts to form a bond between the elastomeric material and the case. This can present a problem if a composite polytetrafluoroethylene and elastomer sealing element is to be bonded to the case.

That is, in order to complete the assmebly of a composite lip seal to an elastomer-coated case as described above, the thermally set adhesive must be removed from the area on the case to which the composite element is to be bonded. Fresh adhesive must then be applied before the composite element is bonded to the case. This procedure is not only time consuming but is most inconvenient and incurs significant cost.

Accordingly, a need has arisen for an improved method and seal design which avoids the necessity of removing set adhesive from the seal case to provide a clean bond site for a composite lip seal. A further need exists for a composite lip seal which will effectively absorb dynamic shock loads thereby preventing premature seal failure.

SUMMARY OF THE INVENTION

The present invention has been developed to overcome the drawbacks noted above and has as a primary object the provision of a composite lip seal structure having an outer bore-engaging surface coated with an elastomeric material for effectively sealing irregular bore surfaces while simultaneously providing a non-rigid elastomeric coating over that portion of the seal, typically the radially projecting flange, to which the composite seal element is attached. The non-rigid elastomeric coating on the radial flange serves to effectively absorb shock transmitted from a rotating member through the sealing portion of the composite lip element to the case member thereby increasing the useful life of the seal.

Another object to the invention is to simplify the assembly of a composite lip seal element to a seal case member provided with an elastomeric coating on its outer surface.

Still another object is to simultaneously apply an elastomeric coating to the outer surface of a seal as well as to that portion of the seal, typically the radial flange, to which the composite lip element is bonded.

The realization of these objects and various other objects, features and attendant advantages of the present invention will be more fully appreciated from the following detailed description when considered in connection with the accompanying drawings, in which the same reference numbers designate the same or corresponding parts throughout.

BRIEF DESCRIPTION OF THE DRAWINGS

In Brief the Drawings include:

FIG. 1, which is a radial cross section through a portion of an annular lip seal according to the invention, prior to assembly of the composite lip element to the case;

FIG. 2, which is a radial cross section through a portion of the seal of FIG. 1 after assembly of the composite lip element to the case; and FIG. 3 which is a radial cross section through a portion of the seal of FIG. 2 and shown as installed in a typical application depicting the accommodation of shock loading through the resilience provided by an elastomeric coating.

DESCRIPTION OF THE PREFERRED EMBODIMENTS

The invention will now be described in conjunction with the drawings beginning with FIG. 1, which shows a case member 1, which may be formed of a relatively rigid metal or plastic material. The case member is generally annular in shape as is conventional in lip seal design and includes an axially extending portion 3 and a radially extending portion 5. In order to bond the elastomeric coating 7 to the case member, a thermosetting adhesive is applied to the case surfaces to which the elastomer is to be bonded, such as at 9. The adhesive-treated case member is then placed within a mold cavity and the elastomeric coating is then applied over the case member in a conventional manner. The adhesive is thermally set during the vulcanization of the elastomeric material within the mold thereby providing a strong bond between the case member and the elastomeric material.

After the elastomer-coated case is removed from the mold it is in suitable condition for direct application of an adhesive required to bond a composite element thereto as described below. This second application of adhesive can be applied by any conventional method such as by spraying or dipping.

As further seen in FIG. 1, the elastomeric coating is molded over the outer surface 11 of the axially extending portion 3, the outer surface 13 of the radially extending portion 5, as well as the inner surface 15 of the radially extending portion 5. The elsastomeric material molded to the inner surface of the radially extending portion of the case provides a clean bonding surface area 17 for subsequent bonding of a lip sealing element. If desired, a dirt exclusion lip 18 may be molded to the inner end of the radially extending portion while molding the elastomeric coating to the case.

By coating inner surface 15 with elastomeric material, the removal of previously applied and thermally set adhesive is obviated. Conventional seal designs without such elastomeric coating applied to inner surface 15 necessitate the removal of the set adhesive from surface 15 after vulcanization in order to provide a clean bonding surface for the subsequent bonding of a lip seal element to the case. Thus, the present design greatly facilitates the bonding of a composite lip seal element to the case member.

Since area 17 is suitable for bonding without requiring any cleaning, the assembly and attachment of a lip sealing element is facilitated. If the inner surface 15 of flange 5 was not coated with elastomer, it would require removal of any set adhesive bonded thereto. Thus, by coating surface 15 with elastomer, a cleaning step is avoided.

After adhesive 25 is applied to surface 17, the composite lip seal element 19 is placed over the adhesive and bonded in place. Element 19 includes an elastomeric portion 21, preferably a resilient plastic material such as rubber or polyurethane, and a polytetrafluoroethylene (PTFE) portion 23 bonded radially concentric thereto along an axially extending interface 20. The elastomeric portion 21 is bonded to the surface 17 creating an elastomer to adhesive to elastomer bond interface.

As seen in FIG. 3, an advantageous result of this improved seal design and assembly method is realized in use during shock loading of the composite element 19 by radial movement or displacement 27 of shaft 29 within bore housing 30. This movement often results from impact loading of the shaft, shaft whip, and other well known causes. The elastomeric material to which element 19 is bonded serves as a non-rigid shock absorbing medium which deflects under load as depicted by arrows 31 and reduces shear stress along the bond interface 25. This accommodation of shock along interface 25 results in improved seal life expectancy by preventing separation of the element 19 from the case 1.

Obviously, numerous modifications and variations of the present invention are possible in light of the above teachings. It is therefore to be understood that within the scope of the appended claims, the invention may be practiced otherwise than as specifically described herein.

I claim:
1. A lip seal, comprising:
    a case member formed of a rigid material;
    a coating of a non-rigid resilient elastomeric material provided over at least a portion of said case member; and
    a composite lip seal element which comprises a polytetrafluoroethylene portion bonded radially concentric to a non-rigid resilient elastomeric portion along an axially extending interface and wherein said elastomeric portion of said composite lip seal is bonded with an adhesive to said elastomeric material of said coating to form a non-rigid shock-absorbing elastomer to adhesive to elastomer connection between said coating and said composite lip seal element.

2. The seal of claim 1 wherein said coating defines a dirt exclusion lip.

3. The seal of claim 1 wherein said case member comprises an axially extending portion and a radially extending portion and wherein said coating of elastomeric material is provided over at least a portion of the outer surface of said axially extending portion and over at least a portion of the inner surface of said radially extending portion.

4. The seal of claim 3 wherein said composite lip seal element is bonded to said coating of elastomeric material provided over at least the inner surface of said radially extending portion of said case member.

5. A lip seal comprising:
    a case member formed of a rigid material selected from the group consisting of plastic and metal;
    a coating of a non-rigid resilient elastomeric material selected from the group consisting of rubber and polyurethane, said coating provided over at least a portion of said case member; and
    a composite lip seal element having a polytetrafluoroethylene portion bonded radially concentric to a non-rigid resilient elastomeric portion along an axially-extending interface and wherein said elastomeric portion of said composite lip seal is bonded with an adhesive to said elastomeric material of said coating to form a non-rigid shock-absorbing elastomer to adhesive to elastomer connection between said coating and said composite lip seal element.

6. A lip seal comprising:
    a case member formed of a rigid member selected from the group consisting of plastic and metal;
    a coating of a non-rigid resilient elastomeric rubber material provided over at least a portion of said case member; and
    a composite lip seal element having a polytetrafluoroethylene portion bonded radially concentric to a non-rigid resilient plastic portion along an axially-extending interface and wherein said resilient plastic portion of said composite lip seal is bonded with an adhesive to said elastomeric rubber material of said coating to form a non-rigid shock-absorbing elastomer to adhesive to elastomer connection between said coating and said composite lip seal element.

* * * * *